United States Patent [19]

Oyama et al.

[11] Patent Number: 5,289,515
[45] Date of Patent: Feb. 22, 1994

[54] ASSEMBLY METHOD AND GRID FOR NUCLEAR FUEL ASSEMBLY

[75] Inventors: Junichi Oyama; Kazuichi Suzuki; Akihiro Kato, all of Ibaraki; Hitoshi Inada, Kobe; Masaji Mori, Kobe; Hiromasa Miyai, Kobe; Toshiyuki Kawagoe, Tokyo, all of Japan

[73] Assignee: Mitsubishi Nuclear Fuel Co., Tokyo, Japan

[21] Appl. No.: 745,401

[22] Filed: Aug. 15, 1991

Related U.S. Application Data

[62] Division of Ser. No. 460,626, Jan. 3, 1990, Pat. No. 5,068,081.

[30] Foreign Application Priority Data

Jan. 6, 1989 [JP] Japan ........................... 64-957

[51] Int. Cl.$^5$ ............................................. G21C 3/334
[52] U.S. Cl. ................................. 376/442; 376/446; 376/261
[58] Field of Search ............... 376/261, 438, 441, 442, 376/446

[56] References Cited

U.S. PATENT DOCUMENTS

| | | | |
|---|---|---|---|
| 3,795,040 | 3/1974 | Jabsen | 376/446 |
| 3,933,583 | 1/1976 | Jabsen | 376/446 |
| 3,982,994 | 9/1976 | Jabsen | 376/446 |
| 4,651,403 | 3/1987 | DeMario et al. | 376/261 |
| 4,729,867 | 3/1988 | DeMario | 376/261 |

FOREIGN PATENT DOCUMENTS

| | | |
|---|---|---|
| 52-46594 | 11/1977 | Japan . |
| 54-44360 | 12/1979 | Japan . |
| 55-12555 | 4/1980 | Japan . |
| 60-49873 | 11/1985 | Japan . |
| 61-225695 | 10/1986 | Japan . |
| 63-27792 | 2/1988 | Japan . |

Primary Examiner—Daniel D. Wasil
Attorney, Agent, or Firm—Oblon, Spivak, McClelland, Maier & Neustadt

[57] ABSTRACT

In a method of assembling a nuclear fuel assembly, a deflecting jig is inserted into grid cells in each of a plurality of grids. The diameter of the deflecting jig is enlarged to urge a spring of at least one pair of dimples and spring, associated with the grid cell to deflect the springs away from the dimple. A plurality of elongated key members are inserted into the grid cells through a plurality of openings defined at intersections between the straps forming walls of the grid cells. Each key member is rotated about its axis to cause hooks of the key member to project from a wall surface of the strap in a direction opposite to the projecting direction of the springs. The key member is then moved in a direction to engage the hooks with the wall surface of the strap. Urging of the spring by the deflecting jig is released to allow the same to be withdrawn from the grid cells and, subsequently, the fuel rods are inserted into the respective grid cells. The key member is then moved in a direction to bring the springs into pressure contact with the fuel rods. The key members are then withdrawn from the grid cells. A combination of the grid and the key member is also provided.

6 Claims, 5 Drawing Sheets

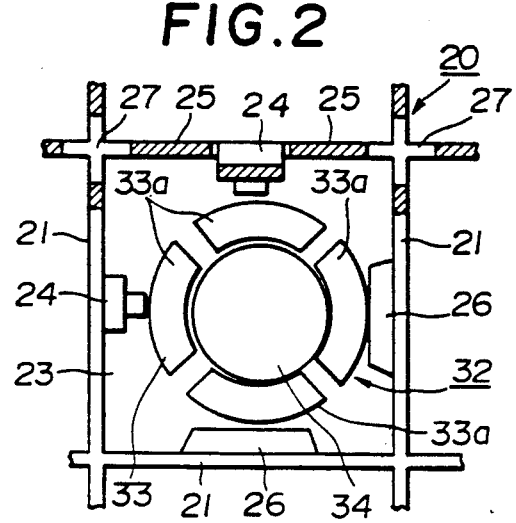
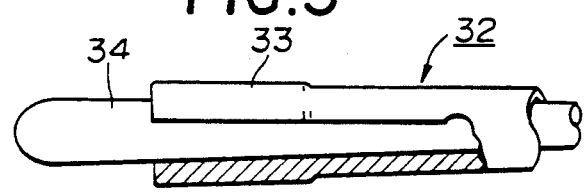
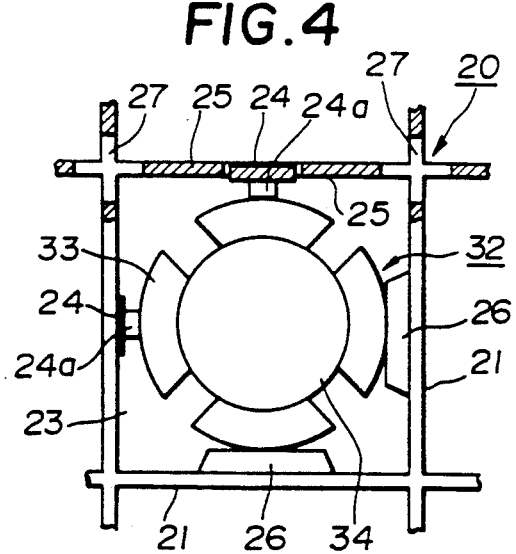
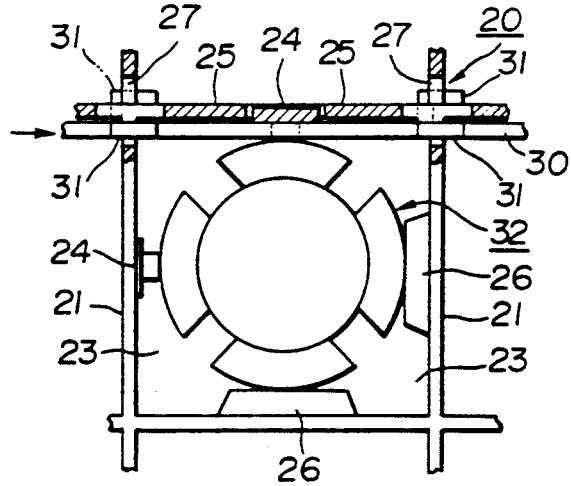

ASSEMBLY METHOD AND GRID FOR NUCLEAR FUEL ASSEMBLY

This is a division, of application Ser. No. 07/460,626, filed on Jan. 3, 1990, now U.S. Pat. No. 5,068,081.

BACKGROUND OF THE INVENTION

1. Field of the Invention

The present invention relates to an assembly method for a nuclear fuel assembly, capable of preventing scratches from occurring on outer peripheral surfaces of nuclear fuel rods when the nuclear fuel assembly is assembled, and to a grid in the nuclear fuel assembly for supporting the fuel rods.

2. Prior Art

FIG. 10 of the attached drawings depicts an example of a nuclear fuel assembly which is mounted on a nuclear reactor such as a pressurized water reactor or the like.

In this assembly, a pair of top and bottom nozzles 1 and 2 are arranged in facing relation to each other and in vertically spaced relation to each other. A plurality of control-rod guide thimbles 3 extend between and are securely fixed to the top and bottom nozzles 1 and 2. A plurality of grids 4 are secured to intermediate portions of the respective control-rod guide thimbles 3 in vertically spaced relation to each other.

As shown in FIGS. 11 through 13, each of the grids 4 is formed as follows. That is, a plurality of straps 7, each in the form of a thin strip sheet, are assembled perpendicularly to each other into a grid by mutual fitting of slits 8 which are formed in the straps 7 in longitudinally equidistantly spaced relation to each other. A plurality of grid cells 5 are defined in each of the grids 4. A pair of dimples 9 and 9 and a pair of springs 10 and 10 for supporting a fuel rod 6 are formed on the wall surface of each of the grid cells 5 in opposed relation to each other. The fuel rod 6 inserted in the grid cell 5 is supported in urging relation to the dimples 9 by the springs 10.

An assembly method of the nuclear fuel assembly constructed above will next be described.

First, the grids 4 are arranged in vertically spaced relation to each other at a predetermined spacing. The control-rod guide thimbles 3 are then inserted into and fixed to predetermined grid cells 5 of each of the grids 4, respectively. Subsequently, the fuel rods 6 are inserted into corresponding grid cells 5 in each of the grids 4 which are supported by the control-rod guide thimbles 3, with the fuel rod 6 in sliding contact with the dimples 9 and the springs 10. In this manner, the fuel rods 6 are fixedly arranged in corresponding grid cells 5 through the dimples 9 and the springs 10. After insertion of all the fuel rods 6, the pair of top and bottom nozzles 1 and 2 are fixedly mounted respectively to the opposite ends of the control-rod guide thimbles 3.

In the aforesaid assembly method of the nuclear fuel assembly, when the fuel rods 6 are inserted respectively into the grid cells 5 in each of the grids 4, the outer peripheral surface of each of the fuel rods 6 is clamped between the dimples 9 and the springs 10, and the fuel rod 6 must be inserted into the corresponding grid cells 5, while the fuel rod 6 resists the resilient force of the springs 10. Thus, there is a problem that the outer peripheral surface of the fuel rod 6 is scratched by the springs 10 and the dimples along its longitudinal direction.

SUMMARY OF THE INVENTION

It is therefore an object of the present invention to provide an assembly method for a nuclear fuel assembly, capable of preventing scratches from occurring on an outer peripheral surface of each fuel rod upon assembling of the nuclear fuel assembly.

Another object of the invention is to provide a combination of a grid in the above-mentioned nuclear fuel assembly and a plurality of elongated key members.

According to a first aspect of the invention, there is provided an assembly method of a nuclear fuel assembly, comprising the steps of:

preparing a plurality of grids each of which comprises a plurality of elongated straps intersected with each other to define a plurality of grid cells therein, and a plurality of pairs of dimples and springs formed on the straps for supporting a plurality of fuel rods, each pair of dimples and springs being disposed in facing relation to each other, on wall sections of the straps, which cooperate with each other to define one of the grid cells, the pair of dimples and springs projecting into the grid cell;

subsequently inserting a deflecting jig into one of the grid cells defined in each of the grids, the deflecting jig being in the form of a rod having a diameter capable of being enlarged;

subsequently enlarging the diameter of the deflecting jig to urge the spring associated therewith against resilient force of the spring to deflect the spring away from the dimples associated therewith;

subsequently inserting a plurality of elongated key members, respectively along a longitudinal direction of the straps forming the grid, into the grid cells through a plurality of openings which are defined at intersections between the straps, each of the key members being formed with a plurality of hooks which are spaced a predetermined spacing from each other along the longitudinal direction of the key member;

subsequently rotating each of the key members about its axis to cause the hooks of the key member to project from a wall surface of the strap associated with the key member, through the openings, in a direction opposite to the projecting direction of the springs formed on the strap;

subsequently moving the key member forwardly in the longitudinal direction of the strap to engage the hooks of the key member with the wall surface of the strap, thereby fixedly mounting the key member to the strap to maintain the springs deflected;

subsequently releasing the urging of the spring due to the deflecting jig to withdraw the same from the grid cell and, subsequently, inserting the fuel rods respectively into the grid cells;

subsequently moving the key member rearwardly to release retention of the springs due to the hooks of the ke member thereby bringing the springs into pressure contact with the fuel rods, respectively; and withdrawing the key members from the grid cells.

According to a second aspect of the invention, there is provided a combination of a grid in a nuclear fuel assembly and a plurality of elongated key members, the grid comprising a plurality of elongated straps intersected with each other to define a plurality of grid cells therein, a plurality of pairs of dimples and springs formed on the straps for supporting a plurality of fuel rods, and a plurality of openings which are defined at intersections among the straps, each pair of dimples and springs being disposed in facing relation to each other, on wall sections of the straps, which cooperate with each other to define one of the grid cells, the pair of dimples and springs projecting into the grid cell, and each of the elongated key members being provided for maintaining the springs deflected respectively away from the dimples, the key member being capable of being inserted into the grid cells through the openings along a longitudinal direction of a corresponding one of the straps.

According to the assembly method of the nuclear fuel assembly and the combination of the grid and the elongated key members, when the fuel rods are inserted respectively into the grid cells of the grid, the deflecting jig is inserted into the grid cells and is enlarged in diameter to deflect the springs away from the dimples facing thereto, the key member is inserted into the grid cells through the openings formed at intersections among the straps, and the key member is rotated and moved forwardly whereby the hooks of the key member are engaged with the wall surface of the strap, to maintain the springs deflected. Under such condition, the distance between the spring and the dimples facing thereto becomes larger than the diameter of the fuel rod. Therefore, the fuel rods do not slide in contact with the springs and dimples, and the outer peripheral surfaces of the respective fuel rods are not clamped between the spring and the dimples. Accordingly, no scratches occur on the outer peripheral surfaces of the fuel rods. In addition, since, when the fuel rods are inserted respectively into the grid cells, the fuel rods are not clamped between the springs and the dimples, no unreasonable tension force is applied to the fuel rods, and it is possible to reduce a power source for inserting the fuel rods respectively into the grid cells. Thus, it is possible to made an inserting unit and so on compact.

BRIEF DESCRIPTION OF THE DRAWINGS

FIG. 2 is a partially broken-away, fragmentary top plan view of a deflecting jig which is inserted into one of a plurality of grid cells defined in the grid shown in FIG. 1;

FIG. 3 is a partially broken-away, side elevational view of the deflecting jig illustrated in FIG. 2;

FIG. 4 is a view similar to FIG. 2, but showing a pair of springs which are deflected by the deflecting jig illustrated in FIG. 3;

FIG. 5 is a view similar to FIG. 2, but showing a key member which is inserted into the openings in the straps illustrated in FIGS. 1 and 2;

DESCRIPTION OF THE PREFERRED EMBODIMENT OF THE INVENTION

Figure 1:
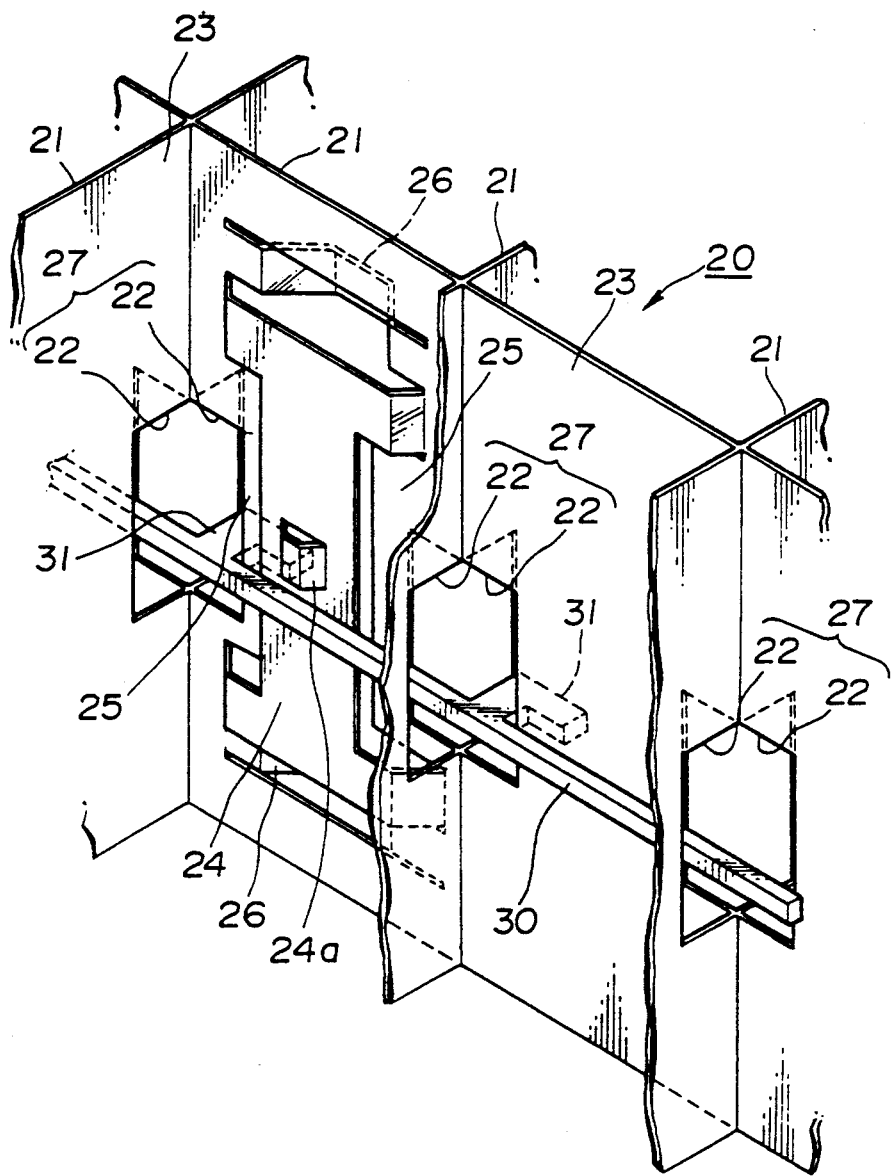
FIG. 1 is a fragmentary enlarged perspective view showing an assembly method of a nuclear fuel assembly and a grid in the nuclear fuel assembly, according to an embodiment of the invention, wherein a key member is inserted into openings in a plurality of straps which form one of a plurality of grids.

Referring first to FIG. 1, there is shown, in an enlarged fragmentary perspective view, one of a plurality of grids 20 in a nuclear fuel assembly which is mounted on a nuclear reactor such as a pressurized water reactor or the like. In this connection, the nuclear fuel assembly is similar in construction to that described previously with reference to FIG. 10, and the description of the nuclear fuel assembly will therefore be omitted to avoid duplication.

The grid 20 is composed of a plurality of elongated straps 21 each in the form of a strip sheet, which are assembled into a lattice. The straps 21 cooperate with each other to define a plurality of grid cells 23 each of which is substantially rectangular in shape. Each of the elongated straps 21 is formed with a plurality of cut-outs 22 in a widthwise central portion of the strap 21. The cut-outs 22 in the strap 21 are each in the form of a rectangle and are spaced a predetermined distance from each other in a longitudinal direction of the strap 21.

A spring 24 is formed between each pair of adjacent cut-outs 22 and 22 in the strap 21, and is projected into the grid cell 23. The spring 24 is formed such that a wall section of the strap 21 is cut at two locations, and a portion between the two cuts is projected into the grid cell 23. The spring 24 is formed at its center with a projection 24a which is in pressure contact with a fuel rod 36 (refer to FIGS. 8 and 9). A pair of wall sections of the strap 21 in the longitudinal direction thereof, between which the spring 24 is located, are formed into a pair of ribs 25 and 25, one of which being engaged with a corresponding one of a plurality of hooks of a key member subsequently to be described. A pair of dimples 26 and 26 are formed at respective positions in the widthwise direction of the strap 21, between which the spring 24 is located. The dimples 26 and 26 are projected in a direction opposite to the spring 24.

A plurality of straps 21 each constructed as described above are assembled into a grid thereby forming the grid 20 having a plurality of grid cells 23 into which the fuel rods 16 are inserted respectively. In each of the grid cells 23, the two pairs of springs 24 and dimples 26, which are projected into the grid cell 23, are arranged on the wall sections of the respective straps 21 in respectively facing relation to each other. Further, the cut-outs 22 in one of the straps 21 and the cut-outs 22 in the other strap 21 are combined with each other respectively at intersections between the straps 21 to form a plurality of openings 27. The openings 27 formed respectively at the intersections are arranged straight along the longitudinal direction of the strap 21. Each of a plurality of elongated key members 30 is capable of being inserted into these openings 27 which ar arranged straight along the strap 21.

The elongated key member 30 is in the form of a rod having a rectangular cross-section, and being longer than one side of the grid 20. The key member 30 has a plurality of hooks 31 formed on one side. The hooks 31 are oriented in the same direction, and are spaced a predetermined distance from each other in the longitudinal direction of the ke member 30. In other words, the hooks 31 are spaced from each other by a distance identical with that by which the cut-outs 22 formed in the strap 21 are spaced from each other. The hooks 31 are each in the form of an L-shape, and are engaged respectively with the ribs 25 to clamp the ribs 25 and the springs 24 between the hooks 31 and the body of the key member 30. Thus, the hooks 31 hold the springs 24 such that the springs are deflected so as to be flush with the ribs 25.

A method of assembling the nuclear fuel assembly, which uses the grid 20 constructed above, will next be described with reference to FIGS. 2 through 9.

As shown in FIG. 2, each of a plurality of deflecting jigs 32 in the form of a rod having a circular cross-section is inserted into a corresponding one of the plurality of grid cells 23 in the grid 20.

Here, as shown in FIGS. 2 and 3, the deflecting jig 32 is such that a tapered pin 34 is inserted for axial sliding movement in a sleeve 33 divided into four sleeve pieces 33a which are arranged circumferentially. Withdrawal or retraction of the tapered pin 34 causes the four sleeve pieces 33a of the sleeve 33 to be urged or pushed outwardly so that the sleeve 33 is opened, that is, its diameter is expanded or enlarged.

Subsequently, the tapered pin 34 of the deflecting jig 32 inserted in each of the grid cells 23 is retracted. Whereupon, as shown in FIG. 4, the sleeve 33 is enlarged to urge the projection 24a on the spring 24 against the resilient or elastic force thereof. Thus, the spring 24 is deflected away from the dimples 26 facing thereto, so that the spring 24 is made substantially flush with the ribs 25.

Under the above condition, as shown in FIG. 5, the key member 30 is inserted into the openings 27 from the side face of the grid 20, to position the hooks 31 of the key member 30 respectively at the openings 27. At this time, the hooks 31 are oriented upwardly in FIG. 1, that is, are located in a vertical plane.

Subsequently, the key member 30 is rotated about its axis through 90 degrees to position the hooks 31 within the openings 27, that is, to orient the hooks 31 horizontally. Thus, the hooks 31 project from the wall surface of the strap 21 in a direction opposite to the projecting direction of the spring 24.

Figure 6:
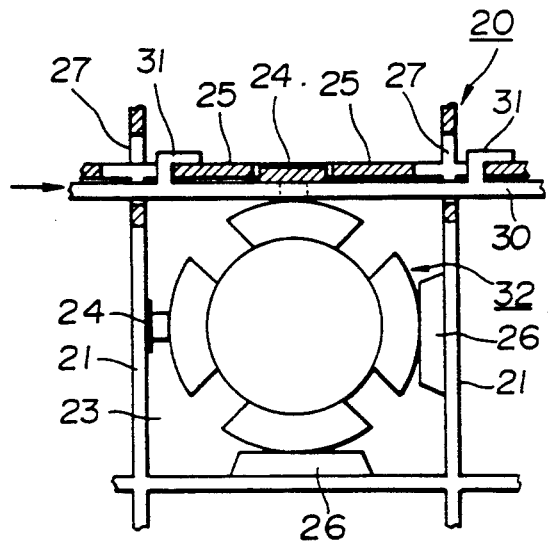
FIG. 6 is a view similar to FIG. 2, but showing one of the pair of springs which is maintained deflected by a corresponding one of a plurality of hooks of the key member illustrated in FIG. 5.

Subsequently, as shown in FIG. 6, the key member 30 is moved forwardly or advanced along the longitudinal direction of the strap 21 as indicated by an arrow. The hooks 31 are engaged respectively with the ribs 25 to fixedly mount the key member 30 to the strap 21. Thus, the spring 24 is maintained deflected. In this connection, a plurality of key members 30 are inserted into the openings 27 in the straps 21 from both directions, that is, from the longitudinal and lateral directions, to hold each pair of springs 24 and 24 projecting into the same grid cell 23 under such a condition that the springs 24 are deflected.

Figure 7:
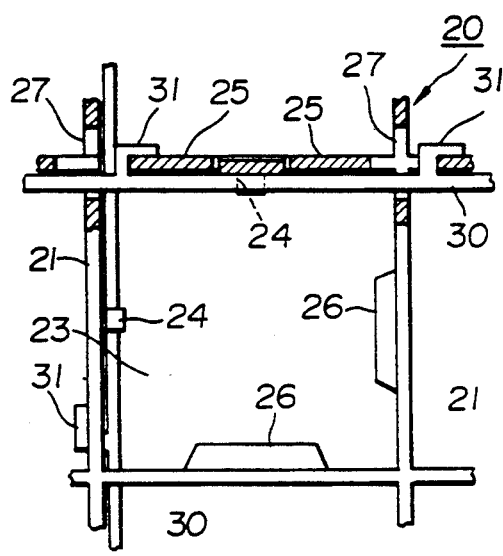
FIG. 7 is a view similar to FIG. 2, but showing the state in which the deflecting jig is drawn and removed from the grid cell so that urging of the pair of springs by means of the deflecting jig illustrated in FIG. 6 is released.

Subsequently, as shown in FIG. 7, the tapered pin 34 of the deflecting jig 32 is pushed or returned to release the urging of the springs 24 due to the sleeve 33, thereby enabling the deflecting jig 32 to be removed from the grid cell 23. In this manner, even though the urging of the springs 24 is released, the springs 24 are held under such a condition that the springs 24 are deflected by the key members 30.

A predetermined number of grids 20, in which the key members are disposed as described, are arranged in spaced relation to each other by a predetermined distance.

Figure 8:
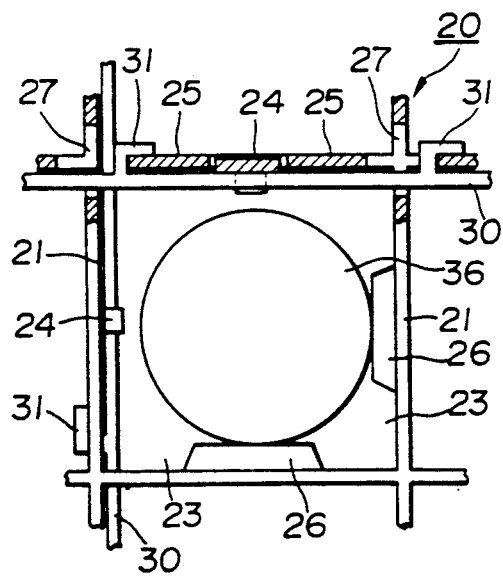
FIG. 8 is a view similar to FIG. 2, but showing a fuel rod which is inserted into the grid cell illustrated in FIG. 7.

Subsequently, as shown in FIG. 8, each of the fuel rods 36 is gripped by a pull-in rod (not shown) to draw the fuel rods 36 into the respective corresponding grid cells 23 in a state of non-contact with the springs 24 and the dimples 26. Thus, the fuel rod 16 rests against the dimples 26.

Figure 9:
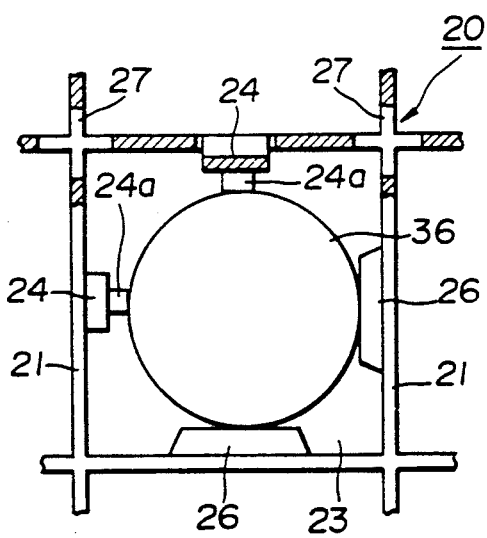
FIG. 9 is a view similar to FIG. 2, but showing the fuel rod which is clamped between two pairs of dimples and springs illustrated in FIG. 8.

Subsequently, the key members 30 are moved rearwardly, that is, are retracted to disengage the hooks 31 respectively from the ribs 25, thereby releasing retention of the springs 24. Whereupon, as shown in FIG. 9, the springs 24 come into pressure contact with the fuel rod 36. Thus, the fuel rod 36 is clamped between the two pairs of springs 24 and dimples 26, and is fixedly mounted to the grid 20. In addition, the key member 30 is rotated through 90 degrees in a direction opposite to that described above, to return the hooks 31 upwardly within the openings 27. Thus, the key member 30 is withdrawn or removed from the grid 20.

Figure 10:
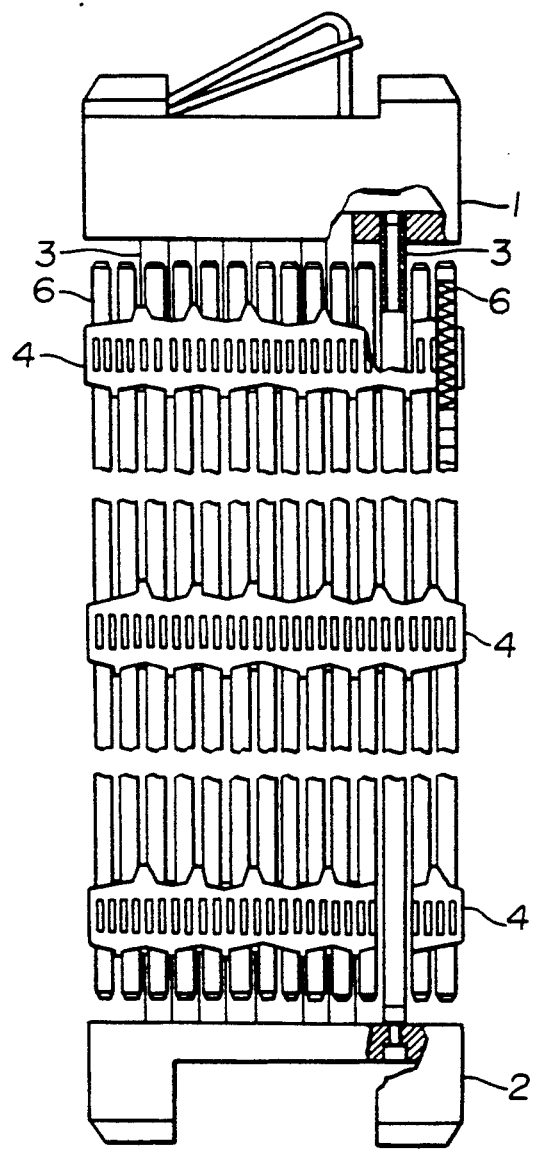
FIG. 10 is a front elevational view of a conventional nuclear fuel assembly.
Figure 11:
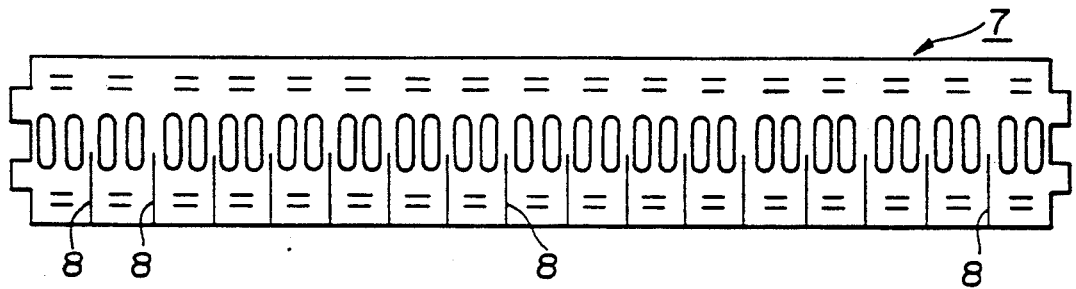
FIG. 11 is a front elevational view of one of a plurality of straps which form one of a plurality of grids illustrated in FIG. 10.
Figure 12:
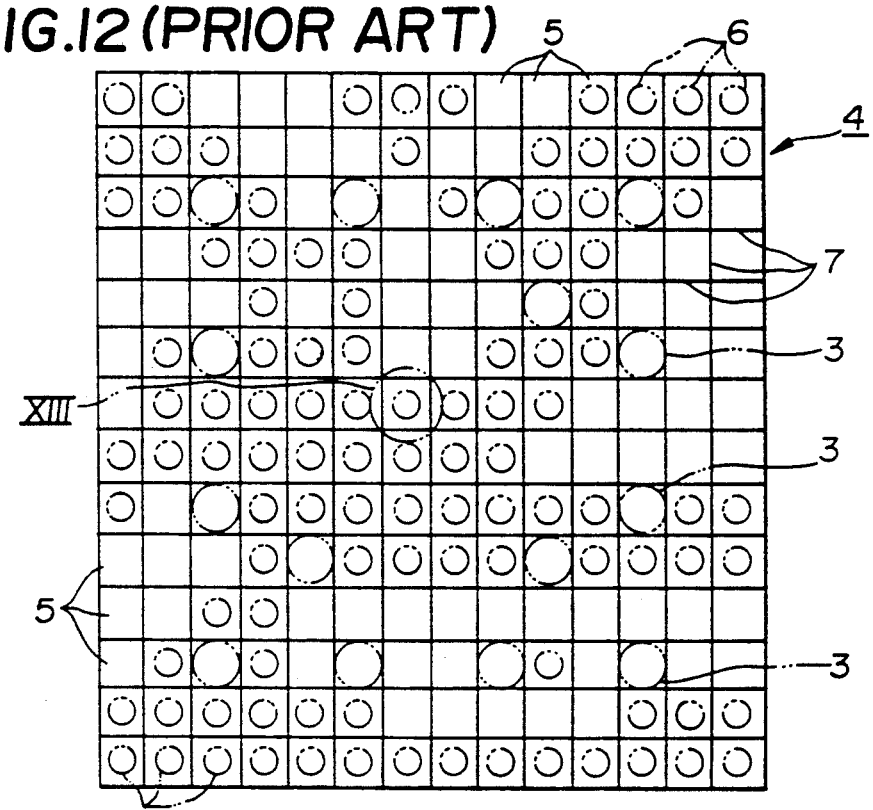
FIG. 12 is a schematic top plan view of the grid illustrated in FIG. 11.
Figure 13:
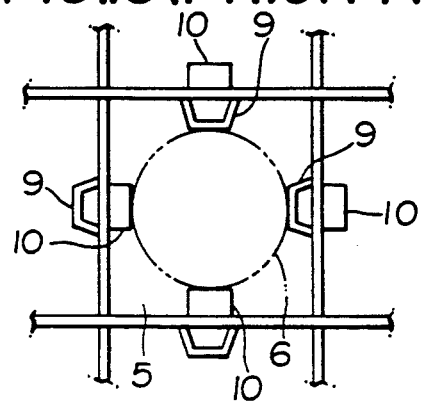
FIG. 13 is an enlarged view of a portion encircled by XIII in FIG. 12 in a double dotted line.

Subsequently, a plurality of control-rod guide thimbles similar to those illustrated in FIG. 10 are inserted into the predetermined grid cells 23, and are fixedly mounted thereto. Lastly, a pair of top and bottom nozzles, which are similar to the pair of top and bottom nozzles 1 and 2 illustrated in FIG. 10, are mounted to the nuclear fuel assembly to complete assembling thereof.

According to the assembly method of the nuclear fuel assembly, which uses the grids 20, a plurality of fuel rods 36 are inserted respectively into the grid cells 23 in each of the grids 20 such that each of the springs 24 is moved away from corresponding two of the dimples 26 facing thereto by the key member 30, and the spring 24 is maintained deflected by the key member 30. Under such condition, the distance between the spring 24 and the dimples 26 facing thereto increases more than the diameter of the fuel rod 36. Accordingly, the fuel rod 36 is not in sliding contact with the springs 24 and the dimples 26 and the outer peripheral surface of the fuel rod 36 is not clamped between the springs 24 and the dimples 26. Thus, no scratches occur on the outer peripheral surface of the fuel rod 36.

Further, when the fuel rod 36 is drawn into the grid cell 23, the fuel rod 36 is not clamped between the springs 24 and the dimples 26. Accordingly, no unreasonable tension is applied to the fuel rod 36, and it is possible to reduce a power source for drawing the fuel rod 36 into the grid cell 23. Thus, it is possible to make a drawing unit or the like compact.

Further, since the pair of ribs 25 and 25 are provided at respective positions between which the spring 24 is located, it is possible to obtain stabilized spring characteristics by the ribs 25 and 25.

In addition, the deflecting jig 32 is composed of the sleeve 33 divided circumferentially into the four sleeve pieces 33a, and the tapered pin 34 inserted into the sleeve 33 for axial sliding movement. Drawing of the tapered pin 34 into the sleeve 33 causes the four divided sleeve pieces 33a of the sleeve 33 to be urged and moved outwardly, whereby the springs 24 are deflected. Thus, when the springs 24 are deflected, no torsion stress is applied to the springs 24, so that strain, cracks and so on that could be caused by the torsion stresses do not occur on the springs 24.

Further, each of the hooks 31 of the key member 30 is engaged with one of the ribs 25 and 25 provided at locations between which the spring 24 is located. Thus, with the ribs 25 and 25 subjected to a reaction force of the spring 24, the spring 24 is maintained deflected. Thus, no undesirable influence such as torsion or the like is exerted upon the spring 24.

What is claimed is:

1. In a combination of a grid for a nuclear fuel assembly and a plurality of elongated key members, said grid comprising a plurality of elongated straps intersected with each other to define a plurality of grid cells therein, a plurality of pairs of dimples and springs formed on said straps for supporting a plurality of fuel rods, and a plurality of openings which are defined at intersections among said straps, each pair of dimples and springs being disposed in facing relation to each other, on wall sections of said straps, which cooperate with each other to define one of said grid cells, the pair of dimples and springs projecting into the grid cell, and each of said elongated key members being provided for maintaining the springs deflected respectively away from the dimples, the key member being capable of being inserted into said grid cells through said openings along a longitudinal direction of a corresponding one of said straps;

the combination further comprising:

a deflecting jig capable of being inserted into one of said grid cells, said deflecting jig being in the form of a rod having a diameter capable of being enlarged to urge the spring associated therewith against resilient force of the spring to deflect the spring away from the dimple associated therewith;

each of said elongated key members being formed with a plurality of hooks which are spaced a predetermined spacing from each other along a longitudinal direction of the key member, and being rotatable about its axis to cause the hooks of the key member to project from a wall surface of the strap associated with the key member, through the openings, in a direction opposite to the projecting direction of the spring formed on the strap, said key member being movable forwardly in a longitudinal direction of the strap to engage the hooks of the key member with the wall surface of the strap, thereby fixedly mounting the key member to the strap to maintain the spring deflected, and being formed such that when the urging of the spring due to said deflecting jig is released to allow the same to be withdrawn from the grid cell and, subsequently, said fuel rods are inserted respectively into said grid cells, said key member is movable rearwardly to release retention of the springs due to the hooks of the key member thereby bringing the springs into pressure contact with the fuel rods, respectively, and allow said key members to be withdrawn from said grid cells.

2. A combination according to claim 1, wherein the pair of dimples and springs are disposed so as to have a distance therebetween which is larger than a diameter of the fuel rod when the respective springs are maintained deflected by the hooks of the key member.

3. A combination according to claim 1, wherein each of said straps includes a plurality of ribs associated respectively with the springs formed on the strap, each of the hooks on the key member being able to be engaged with a corresponding one of the ribs.

4. A combination according to claim 3, wherein each of the ribs is spaced from a corresponding one of the springs in a direction away from the grid cell associated with the spring.

5. A combination according to claim 4, wherein each of the straps includes a plurality of pairs of ribs, and wherein each spring is located between a corresponding pair of ribs.

6. A combination according to claim 1, wherein said deflecting jig comprises a sleeve divided into a plurality of sleeve pieces and a tapered pin inserted into said sleeve for axial sliding movement along the same.

* * * * *